(12) United States Patent
Amram et al.

(10) Patent No.: US 8,719,186 B2
(45) Date of Patent: May 6, 2014

(54) HISTORICAL UTILITY CONSUMPTION DISAGGREGATION

(75) Inventors: Martha Amram, Palo Alto, CA (US); Doug Sauder, Livermore, CA (US)

(73) Assignee: Ennovationz Inc., Mountain View, CA (US)

( * ) Notice: Subject to any disclaimer, the term of this patent is extended or adjusted under 35 U.S.C. 154(b) by 278 days.

(21) Appl. No.: 13/109,960

(22) Filed: May 17, 2011

(65) Prior Publication Data

US 2011/0282506 A1 Nov. 17, 2011

Related U.S. Application Data

(60) Provisional application No. 61/345,261, filed on May 17, 2010, provisional application No. 61/346,697, filed on May 20, 2010.

(51) Int. Cl.
*G06F 17/00* (2006.01)
*G06F 1/32* (2006.01)

(52) U.S. Cl.
USPC ............................ 705/412; 700/291; 705/413

(58) Field of Classification Search
USPC ............. 700/22, 286, 291, 295; 705/412, 413
See application file for complete search history.

(56) References Cited

U.S. PATENT DOCUMENTS

| | | | |
|---|---|---|---|
| 5,566,084 A | 10/1996 | Cmar | |
| 6,642,843 B2 * | 11/2003 | Satoh | 340/509 |
| 6,996,508 B1 | 2/2006 | Culp et al. | |
| 7,091,625 B2 * | 8/2006 | Okusawa et al. | 290/1 R |
| 8,176,095 B2 * | 5/2012 | Murray et al. | 707/805 |
| 8,200,370 B2 * | 6/2012 | Paik | 700/291 |
| 8,249,756 B2 * | 8/2012 | Boss et al. | 700/293 |
| 2002/0040356 A1 | 4/2002 | Gluck et al. | |
| 2002/0120540 A1 | 8/2002 | Kende et al. | |
| 2003/0058095 A1 * | 3/2003 | Satoh | 340/509 |
| 2004/0024483 A1 * | 2/2004 | Holcombe | 700/122 |
| 2005/0143865 A1 * | 6/2005 | Gardner | 700/291 |
| 2005/0190074 A1 | 9/2005 | Cumeralto et al. | |
| 2006/0015269 A1 * | 1/2006 | Rigby et al. | 702/55 |
| 2006/0106741 A1 * | 5/2006 | Janarthanan | 705/412 |
| 2006/0161310 A1 * | 7/2006 | Lal | 700/295 |
| 2008/0189180 A1 * | 8/2008 | Maher et al. | 705/14 |
| 2008/0215469 A1 * | 9/2008 | Maloney | 705/34 |
| 2008/0229226 A1 * | 9/2008 | Rowbottom et al. | 715/771 |
| 2008/0249876 A1 | 10/2008 | Rice et al. | |
| 2008/0306985 A1 * | 12/2008 | Murray et al. | 707/102 |
| 2010/0042453 A1 | 2/2010 | Scaramellino et al. | |
| 2010/0141046 A1 * | 6/2010 | Paik | 307/126 |
| 2010/0274603 A1 * | 10/2010 | Walker et al. | 705/7 |
| 2010/0274611 A1 * | 10/2010 | Kaufman et al. | 705/8 |
| 2011/0040666 A1 * | 2/2011 | Crabtree et al. | 705/37 |

* cited by examiner

*Primary Examiner* — Charles Kasenge
(74) *Attorney, Agent, or Firm* — Convergence Intellectual Property Law P.C.; Steven Gong; D. Bommi Bommannan (57) ABSTRACT

A computer-implemented method for itemizing energy consumption to generate and present a utility consumption profile based on disaggregated historical utility consumption data is disclosed. The computer-implemented method comprises obtaining data indicating historical utility consumption of a dwelling over a time period. A non-seasonal portion of the historical utility consumption data is then determined by first computing an average utility consumption based on one or more predetermined intervals within the time period, and then computing the non-seasonal portion by applying the average to the time period. The non-seasonal portion is then subtracted from the historical utility consumption data to obtain a seasonal portion of the historical utility consumption data. The seasonal and/or non-seasonal portion may be further disaggregated by end-use methods, and presented to the user in the utility consumption profile.

13 Claims, 7 Drawing Sheets

HISTORICAL UTILITY CONSUMPTION DISAGGREGATION

CROSS-REFERENCES TO RELATED APPLICATIONS

The application claims the benefit and priority to U.S. Provisional Application No. 61/345,261 titled "Historical Utility Consumption Disaggregation Methods" filed on May 17, 2010. This application also claims the benefit and priority of U.S. Provisional Application No. 61/346,697 titled "Utility Consumption Saving Methods" filed on May 20, 2010. The full disclosure of each of these related applications are incorporated herein by reference.

BACKGROUND

1. Field of the Disclosure

The present disclosure relates generally to analyzing and disaggregating a historical utility consumption data to generate an itemized utility consumption profile by attributing utility consumption to seasonal utility consumption or non-seasonal utility consumption.

2. Description of the Related Art

With the growing awareness of global warming, climate change, and rising energy costs, consumers and industry increasingly demand greater efficiency in utility consumption. Recently, efforts have been made to activate the residential sector in improving utility consumption efficiency, as the residential sector accounts for 37% of annual electric sales and 21% of natural gas sales. Thus, improving residential utility consumption efficiency may affect energy consumption in a geographic region and lead to monetary savings for the consumers.

However, the residential sector has long been considered the hardest to reach for catalyzing consumption efficiency savings. Some of the barriers to consumer adoption as identified in "Market Failures and Barriers for Clean Energy Policies" by Marilyn Brown, appearing in *Energy Policy* (29) published in 2001, include lack of information, lack of connection to specific opportunities in the dwelling, and lack of clarity about benefits.

To overcome the barriers, it would be desirable to provide a novel method to decompose utility consumption of a dwelling with sufficient resolution in order to obtain an understanding of the utility consumption of the dwelling. Using these disaggregated data, improvements in efficiency can be suggested, evaluated, implemented, and monitored. Specifically, it would be desirable for a novel method to generate a dwelling-specific utility consumption profile based on historical utility consumption information; since by using historical utility consumption information, it would provide a realistic and personalized context to the utility consumption. Additionally, it would be desirable to attribute utility consumption to actual consumption sources in the dwelling, which would provide high-resolution utility information to the consumer and would enable the consumer to see utility consumption in context, and create awareness of efficient utility consumption. At least some of these objectives will be met by the inventions described below.

SUMMARY OF THE INVENTION

The present disclosure provides for the disaggregation of historical utility consumption data to attribute utility consumption to various utility consuming sources associated with a dwelling.

In one aspect, a computer-implemented method for itemizing energy consumption comprises obtaining data indicating historical utility consumption of a dwelling over a time period. A non-seasonal portion of the historical utility consumption data is then determined by first computing an average utility consumption based on one or more predetermined intervals within the time period, and then computing the non-seasonal portion by applying the average to the time period. After the non-seasonal portion is determined, it is then subtracted from the historical utility consumption data to obtain a seasonal portion of the historical utility consumption data.

Thereafter, a utility consumption profile for the dwelling indicating non-seasonal consumption and seasonal consumption is presented to a user. Additionally, the dwelling utility consumption profile may be presented to the user as a comparison with at least one utility consumption benchmark. Furthermore, the dwelling utility consumption data may be averaged to a corresponding billing cycle used by a utility company serving the dwelling, and the average may be presented to the user indicating a billing tier applicable to the computed average consumption.

In another aspect, the present computer-implemented methods may be further utilized to disaggregate historical natural gas consumption and present a natural gas consumption profile to the user. In such embodiments, the seasonal portion may be attributed to dwelling heating and the non-seasonal portion may be attributed to daily natural gas consumption. The present computer-implemented methods further comprise using end-use methods to compute at least one non-seasonal natural gas consumption level corresponding to a dwelling feature such as at least one appliance and presenting the corresponding consumption levels in the natural gas consumption profile to the user. The consumption of the appliance may be determined by at least one parameter of the appliance such as the type of appliance, frequency of usage, and size of the operation of the appliance.

In yet another aspect, the present computer-implemented methods may be further utilized to disaggregate historical electricity consumption and present an electricity consumption profile to the user. In such embodiments, one of the seasonal portions may be attributed to dwelling cooling; another to heating and the non-seasonal portion may be attributed to daily electricity consumption. Additionally, the present computer-implemented methods further comprise using end-use methods to compute at least one non-seasonal electricity consumption level corresponding to at least one dwelling feature and presenting the corresponding consumption levels in the electricity consumption profile to the user.

In one aspect, a sum of the non-seasonal electricity consumption levels may be calculated and the sum is then subtracted from the non-seasonal portion to obtain a residual portion. The residual portion may be further disaggregated to attribute sources that substantially constantly consume electricity. A leftover portion, if any, which is not attributed to any consuming source may be identified, and the size of the leftover portion may be used to indicate the level of confidence in the accuracy of the disaggregation.

In another aspect, the seasonal electricity consumption may be disaggregated to identify and present consumption level corresponding to at least one seasonal variation in the operation of a dwelling feature. A sum of the seasonal consumption level may be subtracted from the seasonal portion to obtain dwelling cooling consumption. Alternatively, dwelling cooling consumption may be obtained by end-use methods, where the consumption may be determined by characteristics of the dwelling, weather data, and the behavior of occupants. The end-use dwelling cooling consumption and the disaggregated dwelling cooling consumption may be compared to indicate the level of confidence in the accuracy of disaggregation.

In yet another aspect, the present computer-implemented methods may be further utilized to disaggregate historical water consumption and present a water consumption profile to the user. In such embodiments, the seasonal portion may be attributed to outdoor water consumption and the non-seasonal portion may be attributed to indoor water consumption. Additionally, the present computer-implemented methods further comprise computing at least one indoor water consumption level corresponding to at least one dwelling feature and presenting the corresponding consumption level in the water consumption profile to the user. The consumption of the dwelling feature may be determined by at least one parameter of the dwelling feature such as the type, frequency of usage, number of occupants and/or size of the operation.

In one aspect, a sum of the indoor water consumption level may be calculated and compared with the disaggregated indoor water consumption to indicate a level of confidence in the accuracy of disaggregation. Additionally, when the sum of the indoor water consumption level is below the disaggregated indoor water consumption, the residual of the disaggregated indoor water consumption may be attributed to outdoor water consumption.

In another aspect, the indoor water consumption may be normalized based on the number of occupants and presented to the user as indoor water consumed per occupant. Additionally, the outdoor water consumption may be normalized based on the area of the dwelling lot and presented to the user as outdoor water consumption per area of the dwelling lot.

Other aspects and variations are presented in the detailed description as follows.

BRIEF DESCRIPTION OF THE DRAWINGS

The present disclosure has other advantages and features which will be more readily apparent from the following detailed description and the appended claims, when taken in conjunction with the accompanying drawings, in which:

FIG. 2 illustrates one exemplary environment where present embodiments may operate in.

DETAILED DESCRIPTION

Although the detailed description contains many specifics, these should not be construed as limiting the scope of the disclosure but merely as illustrating different examples and aspects of the disclosure. It should be appreciated that the scope of the disclosure includes other embodiments not discussed in detail herein. Various other modifications, changes, and variations, which will be apparent to those skilled in the art, may be made in the arrangement, operation, and details of the methods and processes of the present disclosure disclosed herein without departing from the spirit and scope of the disclosure as described.

In accordance with the computer-implemented systems and methods of the present embodiments, historical utility consumption data of a dwelling are analyzed and disaggregated to produce a dwelling utility consumption profile. As referred to herein, the term "dwelling" is meant to include any building, including a single family home, multi-family home, condominium, townhouse, industrial building, commercial building, public building, academic facility, governmental facility, etc. Additionally, as referred to herein, the "historical utility consumption data" is meant to include any utility consumption data including, but not limited to electricity data, natural gas data, and water data. It is further contemplated that the historical utility consumption data may include data relating to other recurring service consumed that is substantially associated with the dwelling, for example, Internet service, cellular voice or data service, etc. The historical utility consumption data may be collected by presenting a user interface, wherein the user may input the data.

One aspect of the disclosed computer-implemented systems and methods is the methodology of identifying historical non-seasonal utility consumption and seasonal utility consumption, wherein the non-seasonal and seasonal consumption account for substantially the entirety of the total historical consumption data. Generally, the non-seasonal utility consumption is utility consumption that is substantially unaffected by variation in environmental factors such as temperature, precipitation, humidity, hours of daylight, etc., whereas the seasonal utility consumption may be substantially affected by such environmental factors.

The disclosed computer-implemented systems and methods are advantageous since seasonal and non-seasonal utility consumption generally have different characteristics. By isolating the amount of consumption, it enables a user to identify utility reduction opportunities for the dwelling. The disclosed computer-implemented systems and methods are further advantageous since the utility consumption profile comprises disaggregated historical data, and thus the profile offers a realistic and individualized view of the dwelling utility consumption.

Another aspect of the computer-implemented systems and methods is the methodology of determining historical non-seasonal consumption. The non-seasonal portion of historical consumption data is established by first determining utility consumption of at least one predetermined interval. Then, the non-seasonal portion of historical consumption data is computed by applying an average of the consumption during the predetermined interval to the entire period of the historical consumption data. The predetermined interval is generally associated with a period where environmental factors will not substantially affect utility consumption for that period, such that the entire utility consumption for that interval may be attributed to non-seasonal utility consumption.

Generally, the predetermined interval is selected to occur within a period of moderate outside temperature. In one embodiment, the predetermined interval is one or more months occurring in transitional seasons such as spring or fall where seasonal utility usage such as heating, cooling, or event-related consumption such as holiday lighting, etc. is generally minimal. In another embodiment, the predetermined interval is one or more months in a season of minimal outdoor water usage.

The determination of the interval may be dependent on the geographical region of the dwelling, and the climate characteristics of that region. For example, the predetermined interval for a dwelling located in temperate climates such as San Francisco, Calif., may be different from the predetermined interval for a dwelling located in continental climates such as Chicago, Ill. Additionally, it is envisioned that the dwelling may be located in a tropical region, where the predetermined interval is within a dry, cool season. Additionally, it is envisioned that the predetermined interval may be determined and/or refined by consolidating historical utility consumption data and corresponding historical weather data, such as National Oceanic and Atmospheric Administration (NOAA) temperature and humidity data.

Additionally, it is contemplated that the non-seasonal and/or the seasonal portions may be further disaggregated by using end-use methods. The end-use methods may comprise presenting a user-interface or conducting a phone interview to collect data indicating one or more parameters of the dwelling, including dwelling features such as number of appliances in the dwelling, their types, and behavioral-dependent features such as appliances usage frequencies. The collected dwelling data may be used to calculate utility consumption attributable to the dwelling features by utilizing various methods, algorithms, and industry knowledge. Various disaggregated portions are reconciled to the historical utility data such that the disaggregated portions represent historical utility consumption of the dwelling.

Figure 1:
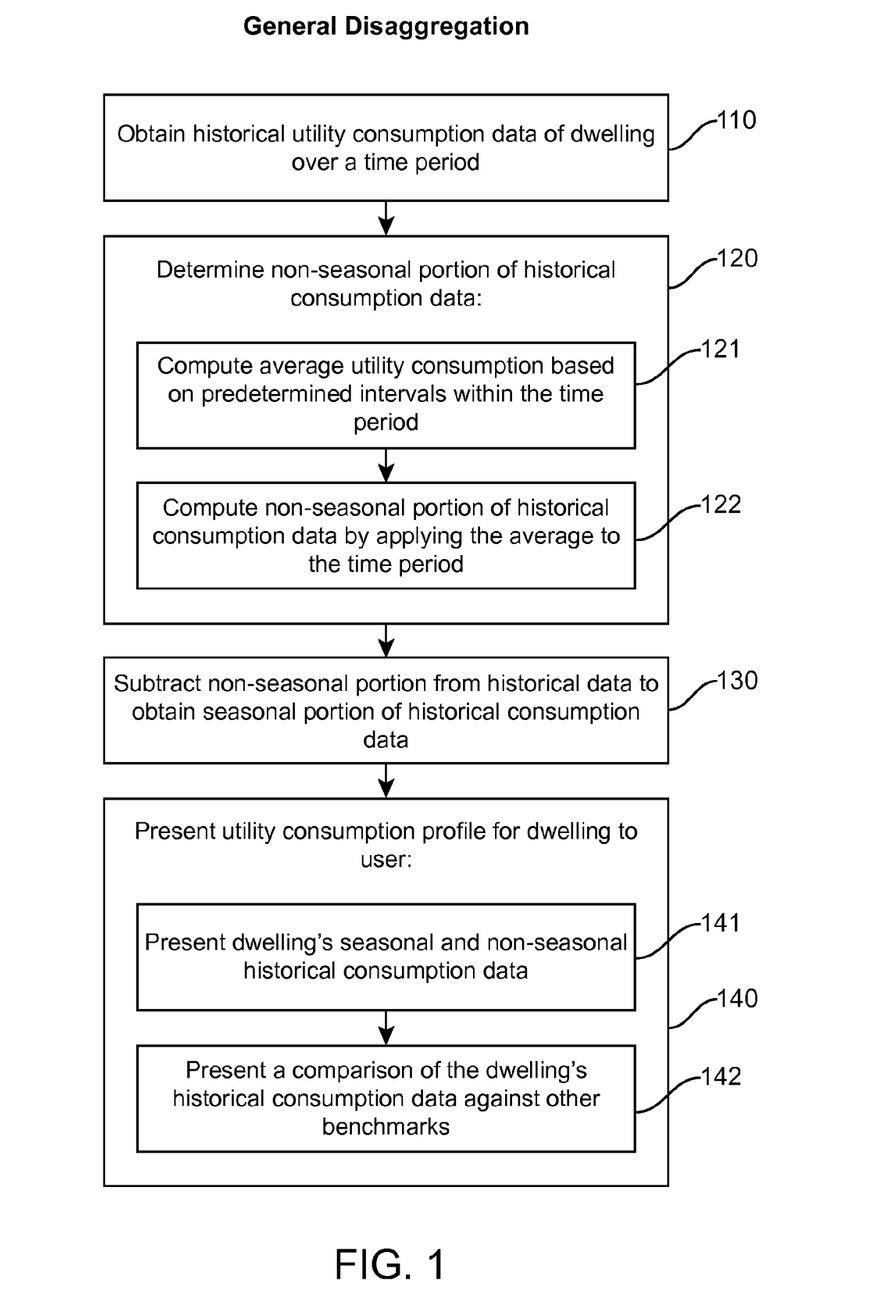
FIG. 1 is a flow diagram illustrating one embodiment of disaggregation of historical utility consumption data.

FIG. 1 is a flow diagram illustrating an exemplary operation of the disclosed computer-implemented methods. At step 110, historical utility consumption data of the dwelling over a time period is obtained. Preferably, the time period is a year, but the time period may also be a month, six months, or any length of time that provides sufficient historical data.

At step 120, a non-seasonal portion of historical consumption data is established by determining and computing an average utility consumption based on predetermined intervals. As shown in FIG. 1, step 120 is divided into sub-steps 121 and 122.

At sub-step 121, the predetermined intervals are selected as described above. Once the predetermined intervals have been established, an average consumption for the intervals is calculated. In one embodiment, the average is calculated by eliminating a maximum and minimum utility consumption of the intervals and calculating the average of the utility consumption of the remaining period. In another embodiment, the average is calculated without eliminating any maximum or minimum consumption data. It is further contemplated that other statistical manipulation may be employed to calculate or adjust the average consumption. At sub-step 122, once the average utility consumption of the intervals has been determined, it is applied to the entire period of the historical data to establish the non-seasonal portion of historical utility consumption.

At step 130, the non-seasonal portion is subtracted from the total historical utility consumption data and the remaining portion is attributed to seasonal utility consumption such that up to 100% of the historical utility consumption data is disaggregated.

At step 140, a utility consumption profile for the dwelling is generated. As shown in FIG. 1, step 140 is divided into sub-steps 141 and 142. At sub-step 141, the seasonal utility consumption portion and the non-seasonal utility consumption portion are presented in the utility consumption profile. Specifically, the seasonal utility consumption is presented along with the origin of the seasonality such as winter heating, summer cooling, etc.

Furthermore, the utility consumption profile may comprise the percentage of total historical utility consumption attributed to various consumption sources, average utility spending, and percentage of total spending attributable to various consumption sources, byproducts emitted by consumption such as carbon dioxide (hereinafter known as carbon), and/or percentage of total carbon emissions attributable to the various consumption sources.

Additionally and optionally, at sub-step 142, the total utility consumption of the dwelling and/or the seasonal and non-seasonal portion of the utility consumption are compared with one or more utility consumption benchmarks. The utility consumption benchmarks may be a utility consumption average of similar dwellings in the region where the dwelling is located, a predetermined low (efficient) utility consumption benchmark, and/or a high (wasteful) utility consumption benchmark. It is further contemplated that a utility consumption benchmark may be a utility consumption of a nearby dwelling, average utility consumption of an area such as a street, a neighborhood, a city, or a country. The utility consumption benchmark may also be an average utility consumption of a group sharing similar education level, income level, similar profession and the like. Furthermore, the utility consumption benchmark may be utility consumptions of one or more individuals that are connected to the user through direct relationships (friends, co-workers, family members), and/or utility consumptions of one or more social network connections of the user, such as Facebook, MySpace, and/or LinkedIn connections.

Figure 2:
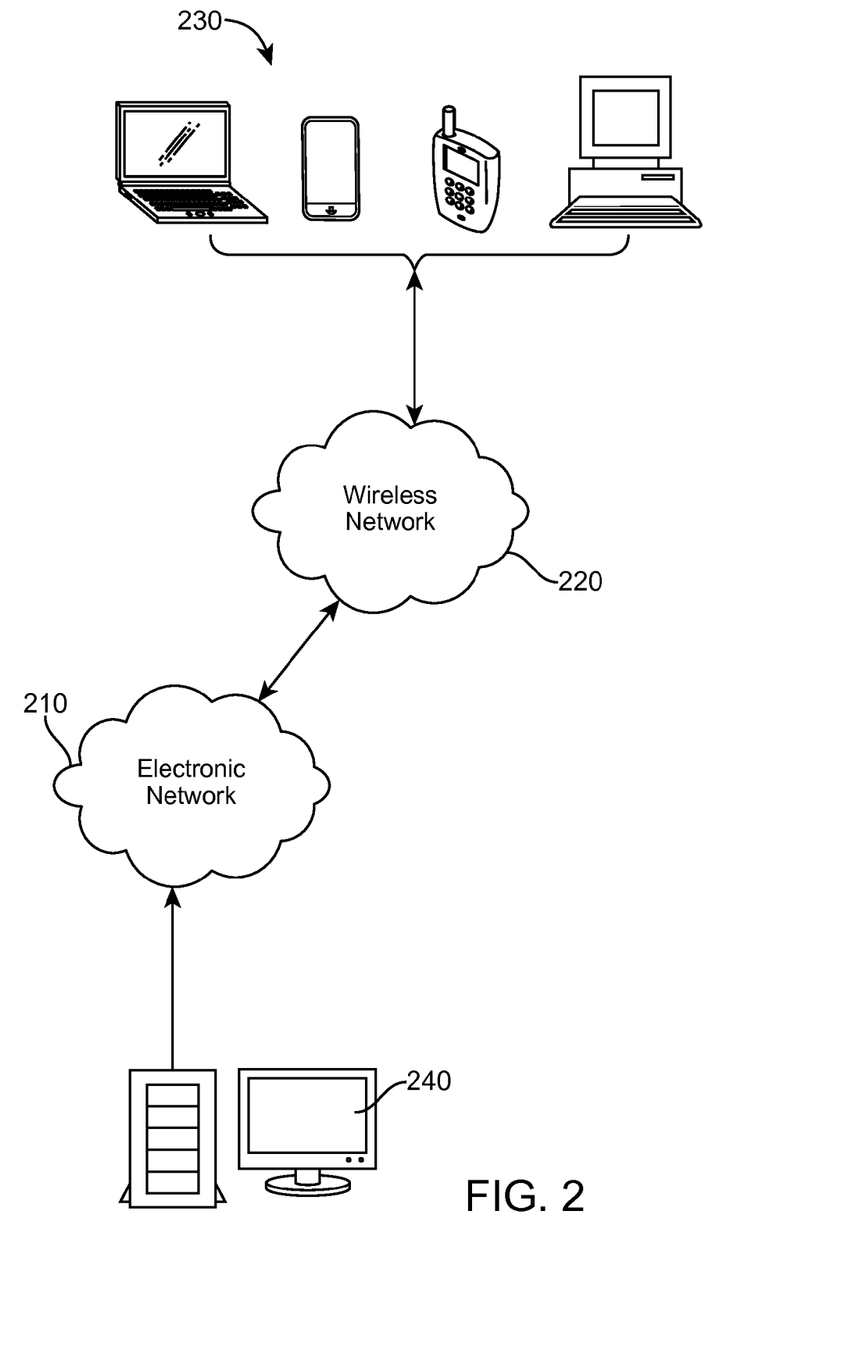

Referring now to FIG. 2, which illustrates components of one embodiment of an environment in which the present disclosure may be practiced. It should be noted, that not all the components described herein may be required to practice present embodiments, and variation may be made without departing from the scope of the present disclosure.

FIG. 2 shows an exemplary operating environment comprising an electronic network 210, a wireless network 220, at least one end-use device 230 and a profile generator 240. The electronic network 210 may be a local area network (LAN), wide-area network (WAN), the Internet, and the like. The wireless network 220 may be various networks that implement one or more access technologies such as Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, ZigBee, High Speed Packet Access (HSPA), Long Term Evolution (LTE), Worldwide Interoperability for Microwave Access (WiMAX), Wi-Fi, and the like.

The wireless network 220 and the electronic network 210 are configured to connect the end-use device 230 and the profile generator 240. It is contemplated that the end-use device 230 may be connected to the profile generator 240 by utilizing the electronic network 210 without the wireless network 220. It is further contemplated that the end-use device 230 may be connected directly to the profile generator 240 without utilizing a separate network, for example, through a USB port, Bluetooth, infrared (IR), firewire port, thunderbolt port, ad-hoc wireless connection, and the like.

The end-use device 230 may be desktop computers, laptop computers, tablet computers, personal digital assistants (PDA), smart phones, mobile phones, and the like. Generally, the end-use device 230 may comprise a processing unit, memory unit, one or more network interfaces, video interface, audio interface, and one or more input devices such as a keyboard, a keypad, or a touch screen. The input devices may also include auditory input mechanisms such as a microphone, graphical or video input mechanisms, such as a camera and/or a scanner. The end-use device 230 may further comprise a power source that provides power to the end-use devices 230 including an AC adapter, rechargeable battery such as Lithium ion battery or non-rechargeable battery.

The memory unit of the end-use device 230 may comprise random access memory (RAM), read only memory (ROM), electronic erasable programmable read-only memory (EEPROM), and basic input/output system (BIOS). The memory unit may further comprise other storage units such as non-volatile storage including magnetic disk drives, flash memory and the like.

The end-use device 230 may further comprise a display such as a plasma display, a projector, liquid crystal display (LCD), light emitting diode (LED), organic light emitting diode (OLED), cathode ray tube (CRT) display and the like. Optionally, the end-use devices 230 may comprise one or more global position system (GPS) transceivers that can determine the location of the end-use device 230 based on the latitude and longitude values. Additionally and optionally, the position data may be obtained through cell tower triangulation, Wi-Fi positioning, or any other methods or technologies for obtaining the position of the end-use device 230.

The network interface of the end-use device 230 may directly or indirectly communicate with the wireless network 220 such as through a base station, a router, switch, or other computing devices. In one embodiment, the network interface of the end-use device 230 may be configured to utilize various communication protocols such as GSM, GPRS, EDGE, CDMA, WCDMA, Bluetooth, ZigBee, HSPA, LTE, and WiMAX. The network interface of the end-use device 230 may be further configured to utilize user datagram protocol (UDP), transport control protocol (TCP), Wi-Fi, satellite links and various other communication protocols, technologies, or methods. Additionally, the end-use device 230 may be connected to the electronic network 210 without communicating through the wireless network 220. The network interface of the end-use device 230 may be configured to utilize analog telephone lines (dial-up connection), digital lines (T1, T2, T3, T4 and the like), Digital Subscriber lines (DSL) or the like.

In one embodiment, the end-use device 230 is a web-enabled device comprising a browser application such as the Microsoft Internet Explorer, Google Chrome, Mozilla Firefox, Apple Safari, Opera, or any other browser or mobile browser application that is capable of receiving and sending data, and/or messages through a network. The browser application may be configured to receive the display data such as graphics, text, multimedia using various web-based languages such as hyperText Markup Language (HTML), Handheld Device Markup Language (HDML), eXtendable markup language (XML), and the like.

The end-use device 230 may comprise other applications including one or more messengers configured to send, receive, and/or manage messages such as email, short message service (SMS), instant message (IM), multimedia message services (MMS) and the like. The end-use device may further comprise mobile application, such as iOS apps, Android apps, and the like.

Furthermore, the end-use device 230 may include a web-enabled application that allows a user to access a system managed by another computing device, such as the profile generator 240. In one embodiment, the application operating on the end-use device 230 may be configured to enable a user to create, manage, and/or log into a user account residing on the profile generator 240.

In general, the end-use device 230 may utilize various client applications such as browser applications, dedicated applications, or web widgets to send, receive, and access content such as energy consumption data and energy saving data residing on the profile generator 240 via the wireless network 220, and/or the electronic network 210.

The profile generator 240 may be one or more network computing devices that are configured to provide various resources and services over a network. For example, the profile generator 240 may provide FTP services, APIs, web services, database services, processing services, or the like.

In general, the profile generator 240 comprises a processing unit, memory unit, video interface, memory unit, network interface, and bus that connect the various units and interfaces. The network interface enables the profile generator 240 to connect to the Internet or other network. The network interface is adapted to utilize various protocols and methods including but not limited to UDP, and TCP/IP protocols.

The memory unit of the profile generator 240 may comprise random access memory (RAM), read only memory (ROM), electronic erasable programmable read-only memory (EEPROM), and basic input/output system (BIOS). The memory unit may further comprise other storage units such as non-volatile storage including magnetic disk drives, flash memory and the like. The memory unit of the profile generator 240 may include a data manager that is configured to store and manage data such as webpage, personal information, utility consumption data, benchmarks, etc. The profile generator 240 may further comprise an account manager that is configured to manage and control user access of the data stored by the data manager through various authorization and authentication methods.

The profile generator 240 further comprises an operating system and other applications such as database programs, hyper text transport protocol (HTTP) programs, user-interface programs, IPSec. programs, VPN programs, account management programs, and web service programs, and the like.

The profile generator 240 may be configured to provide various web services that transmit or deliver content over a network to the end-use device 230. Exemplary web services include web server, database server, massager server, content server, etc. Content may be delivered to the end-use device 230 as HTML, HDML, XML, or the like.

In one embodiment, the profile generator 240 is configured to receive historical utility consumption data of a dwelling over a time period. In one embodiment, the web service of the profile generator 240 is configured to provide a user-interface such as a webpage that is presented to a user through the end-use device 230. Alternatively, the user-interface may be presented to the user through a dedicated application, a web widget, or the like.

The user-interface is configured to prompt the user to upload the historical utility consumption data to the profile generator 240. The upload may comprise uploading a historical utility consumption document file of various formats such as PDF, Microsoft Word, Microsoft Excel, Microsoft PowerPoint and the like to the profile generator 240. The upload may further comprise scanning and uploading an image of the historical utility consumption document using a scanner, and capture and upload an image of the historical utility consumption document using a camera. Alternatively, the user may manually input the historical utility consumption data through the user-interface.

In another embodiment, the user-interface may prompt the user to enter information such as the address of the dwelling and the profile generator 240 is configured to automatically obtain the historical utility consumption data from the data manager of the profile generator 240 or one or more external databases. Furthermore, the profile generator 240 may receive location data from the GPS transceiver of the end-use device 230, and, the profile generator 240 may obtain the historical utility consumption data based on the location data. Furthermore, the user-interface my prompt the user to enter other user-related data such as age, education level, number of residents in the dwelling, and environmental awareness. Once the profile generator 240 obtains the historical utility consumption data and/or other user-related data, the data manager may store the data in the memory unit of the profile generator 240.

The profile generator 240 may further provide one or more user-interfaces that allows the collection of data indicating one or more parameters of the dwelling, including dwelling features such as number of appliances in the dwelling, their types, and behavioral-dependent features such as appliances usage frequencies.

The profile generator 240 may further comprise a data extractor that is configured to extract data from the obtained historical utility consumption data. In one embodiment, the data extractor is configured to extract data from an uploaded historical utility consumption document file such as a PDF, Microsoft Word, Microsoft Excel, Microsoft PowerPoint and the like. In another embodiment, the data extractor is configured to extract data from an uploaded image of a historical utility consumption document. The data extractor may be further configured to extract data from the historical utility consumption data obtained through one or more databases. Additionally and optionally, the data extractor may be configured to extract data from the manually inputted historical utility consumption data.

Based on the extracted data, the profile generator 240 may compute a non-seasonal portion of the historical utility consumption data by first computing an average utility consumption based on one or more predetermined intervals within the time periods, and computing the non-seasonal portion by applying the average to the time period, subtracting the non-seasonal portion from the historical utility consumption data to obtain a seasonal portion of the historical utility consumption data as described above and illustrated in FIG. 1.

The profile generator 240 is further configured to generate a utility consumption profile for the dwelling based on the disaggregated historical utility consumption data. The generated utility consumption profile may then be transmitted to the end-use device 230, whereby it is presented to the user. The utility consumption profile may comprise a seasonal utility consumption portion and a non-seasonal utility consumption portion. Specifically, the seasonal utility consumption is presented along with the origin of the seasonality such as winter heating, summer cooling, etc.

Furthermore, the utility consumption profile generated by the profile generator 240 may comprise the percentage of total historical utility consumption attributed to various consumption sources, average utility spending, and percentage of total spending attributable to various consumption sources, byproducts emitted by consumption such as carbon, and/or percentage of total carbon emissions attributable to the various consumption sources.

Additionally and optionally, the profile generator 240 may compare the utility consumption profile with one or more utility consumption benchmarks. The utility consumption benchmarks are one or more utility consumption profiles that share one or more attributes with the generated utility consumption profile of the dwelling. The benchmarks may be a utility consumption average of similar dwellings in the region where the dwelling is located, a predetermined low (efficient) utility consumption benchmark, and/or a high (wasteful) utility consumption benchmark.

It is further contemplated that the utility consumption benchmark may be a utility consumption of a nearby dwelling, average utility consumption of an area such as a street, a neighborhood, a city, or a country. The utility consumption benchmark may also be an average utility consumption of a group sharing similar education level, income level, similar profession and the like. Furthermore, the utility consumption benchmark may be utility consumptions of one or more individuals that are connected to the user through direct relationships (friends, co-workers, family members), and/or utility consumptions of one or more social network connections of the user, such as Facebook, MySpace, and/or LinkedIn connections.

The profile generator 240 may comprise a selection processor that is configured to select the relevant utility consumption benchmarks based on the data received from the end-use device 230. For example, the selection processor may select a benchmark based on the location data received through the GPS transceiver and/or user inputted data such as address. The selection processor may also select a benchmark based on other data such as the income level, education level, and environmental awareness of the inhabitants of the dwelling. The selection processor may also select a benchmark based on the user's social network connections. The benchmark data may be stored within the data manager of the profile generator 240 or they may reside on a separate computing device, whereby the selection processor may communicate with one or more separate computing device to obtain the desired benchmark. It is also contemplated that the benchmark may be dynamically generated based on the various data collected from the user. For example, the selection processor may compute an individualized benchmark based a combination of data such as the location of the dwelling, education of the inhabitants.

Figure 3A:
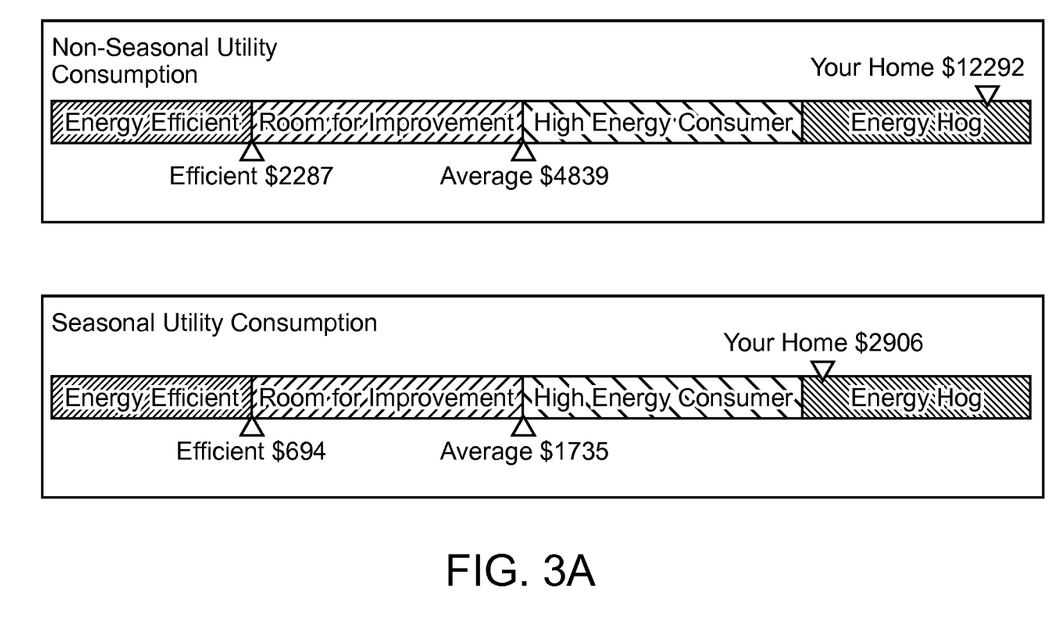
FIG. 3A illustrates an exemplary utility consumption profile presented to the user showing an energy efficiency spectrum and a comparison of dwelling utility consumption profile with two utility consumption benchmarks.

The profile generator 240 is configured to transmit the utility consumption profile and optionally the benchmarks to the end-use device 230, wherein the utility consumption profile is graphically presented to the user through a user-interface. In one embodiment, utility consumption of the dwelling and the one or more utility consumption benchmarks may be indicated on an energy usage spectrum as depicted in FIG. 3A. As seen in FIG. 3A, the utility consumption of the dwelling is indicated along the spectrum representing the degree of energy efficiency. The one or more utility consumption benchmarks are also indicated along the spectrum, which enables the user to determine deviations, if any, between the dwelling utility consumption and the utility consumption benchmarks.

Figure 3B:
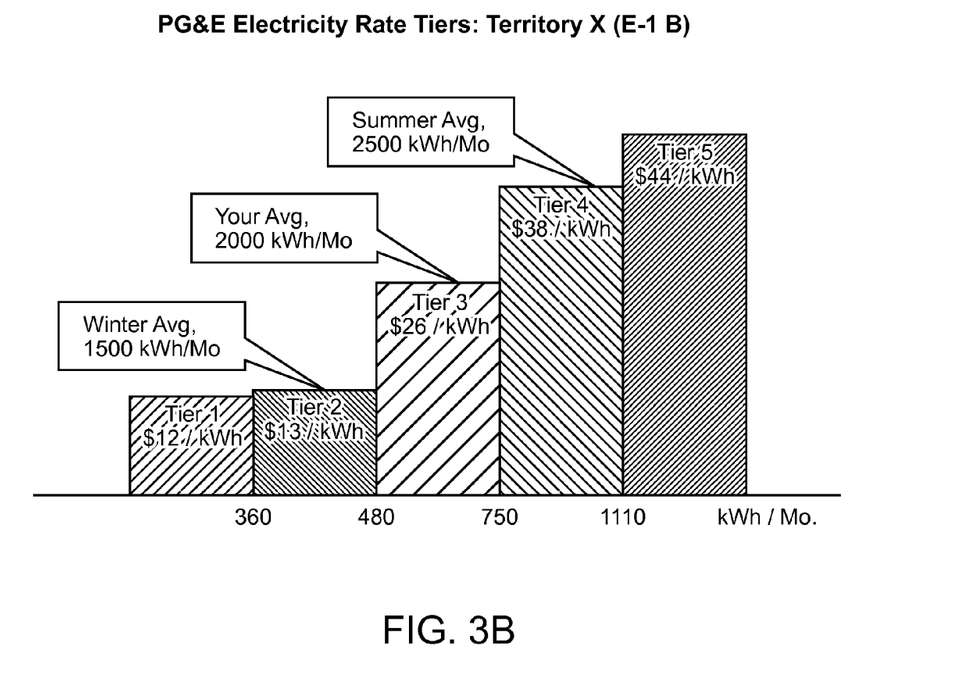
FIG. 3B illustrates an exemplary dwelling utility consumption profile as indicated on a utility billing tier.

Furthermore, as depicted in FIG. 3B, a billing tier used by a utility provider associated with the dwelling may be presented to the user indicating the utility billing level of the dwelling. Specifically, an average or total of the historical utility consumption data, a seasonal utility consumption data, and/or a non-seasonal utility consumption data corresponding to a billing cycle used by a utility provider is indicated on the billing tier applicable to the computed average consumption. As seen in FIG. 3B, the utility consumption of the dwelling is indicated along the spectrum representing the degree of energy efficiency.

Specific embodiments of present methods and systems are described below with respect to the disaggregation of historical gas consumption data, historical electricity consumption data, and historical water consumption data. It is noted that these specific embodiments should not be construed as limiting as it is contemplated that the historical utility consumption data may include data relating to other recurring service consumed that is substantially associated with the dwelling, for example, Internet service, cellular voice or data service, etc. It is further contemplated that specific embodiments may be practiced according to the operating environment and components as illustrated in FIG. 2 and described above, or variations thereof.

Figure 4:
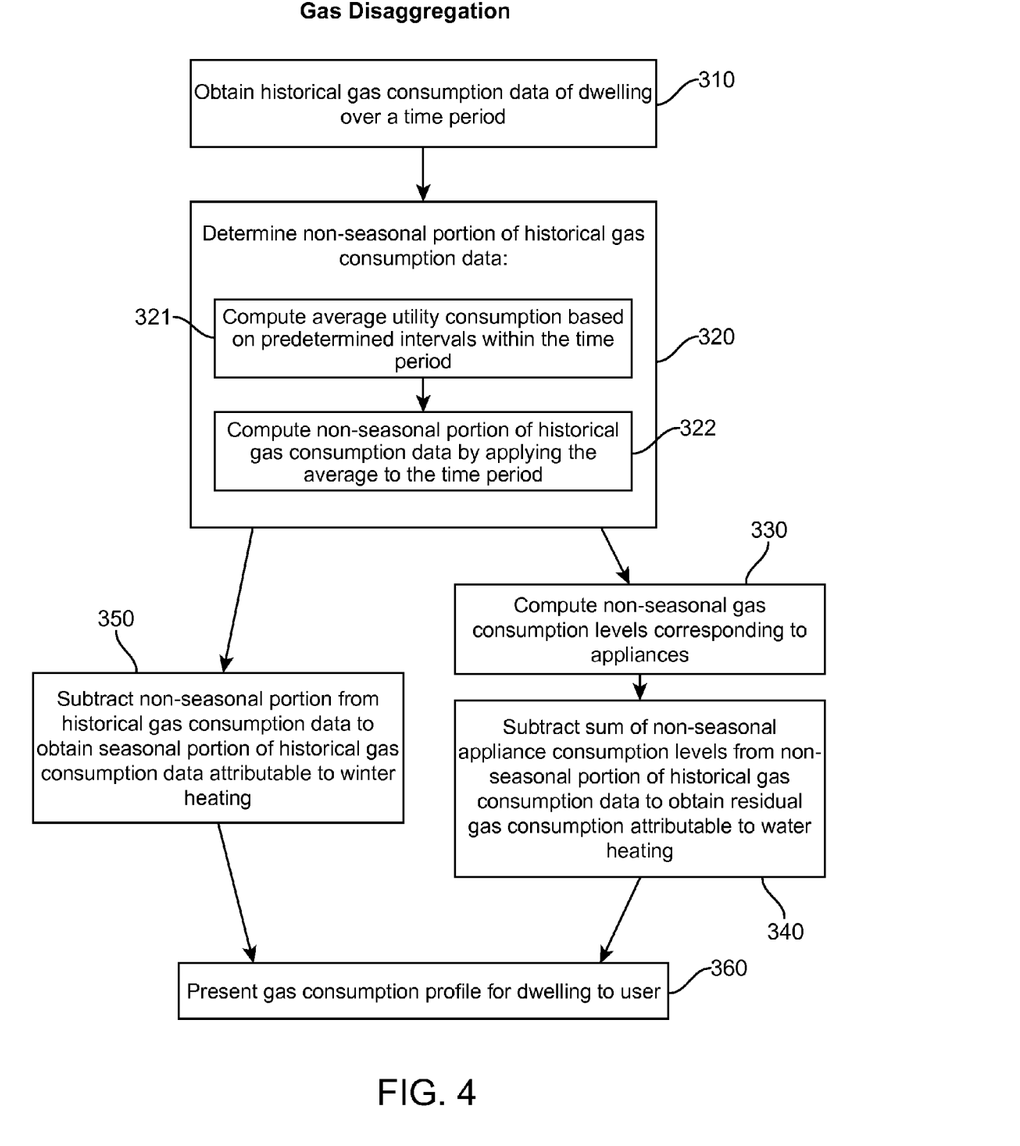
FIG. 4 is a flow diagram illustrating one embodiment of disaggregation of historical gas consumption data.

FIG. 4 is a flow diagram illustrating an exemplary disaggregation of natural gas consumption. At step 310, historical gas consumption data over a time period is obtained. In one embodiment, the historical gas consumption may be obtained from a gas bill issued by the gas utility provider for the dwelling. At step 320, a non-seasonal gas consumption portion is established by applying an average of predetermined intervals to the time period of the historical gas utility data. As shown in FIG. 4, step 320 is divided into sub-steps 321 and 322. At sub-step 321, the predetermined intervals are established based on intervals during which gas consumption is substantially independent of environmental factors as described above. For example, where the dwelling is located in a temperate and/or continental climate, the predetermined intervals occur within the summer season.

The natural gas consumption of the predetermined intervals is then averaged, and at sub-step 322, the averaged natural gas consumption of the predetermined intervals is then applied to the entire period of the historical utility consumption to establish the non-seasonal natural gas consumption as described above.

At step 330, consumptions of various non-seasonal gas consumption sources are determined. Non-seasonal gas consumption sources may be one or more dwelling features. Such dwelling features may be various appliances, other gas consuming devices, and/or characteristics of the dwelling that contribute to natural gas consumption. In one embodiment, dwelling features may include a gas clothes dryer, gas cooking range, gas pool heater, and/or gas spa heater. The natural gas consumption of the various dwelling features may be determined by the characteristics and/or usage patterns of the dwelling feature. For example, the natural gas consumption of a gas clothes dryer may be determined by the gas usage of the dryer adjusted to number of loads washed per week; the natural gas consumption of a gas cooking range may be determined by the amount of usage in the dwelling (frequent cooking, moderate cooking, infrequent cooking, etc.); the natural gas consumption of a pool heater and/or spa heater may be determined by considering a type and/or a schedule of the pool heater and/or spa heater, etc.

At step 340, a sum of the consumptions of the various non-seasonal gas consumption sources are calculated. The sum is then subtracted from the total non-seasonal portion. In one embodiment, the remaining residual portion is then attributed to water heating.

Alternatively, it is contemplated by the disclosed computer-implemented systems and methods that the one or more dwelling features may be associated with water heating. The natural gas consumption of the water heating is determined by the characteristics and/or usage patterns such as number of occupants in the dwelling and the type of water heater. The natural gas consumption of the water heating may then be subtracted from the total non-seasonal portion and the residual portion may be further disaggregated to identify consumption of various sources.

Furthermore, at step 350, as described above, the total non-seasonal portion is subtracted from the total historical utility consumption of the dwelling, and the remaining portion is attributed to seasonal natural gas consumption, such as dwelling heating.

At step 360, the disaggregated historical natural gas consumption profile may be presented to the user, indicating various sources of consumption and the amount of natural gas consumed in actual consumption units, such as therms or in monetary units such as dollars. In one embodiment, the gas consumption profile may indicate the dwelling heating consumption, the water heating consumption, and other natural gas consumption such as appliance gas consumption including dryer, cooking range, pool/spa gas consumption, etc.

As described above, the natural gas consumption profile may be presented in a comparison with one or more gas consumption benchmarks. In one embodiment, the gas consumption attributed to water heating is compared to one or more water heating consumption benchmarks indicating low, average, and/or high water heating consumptions of dwellings in a similar geographic region and/or having similar dwelling characteristics. Similarly, in another embodiment, the gas consumption attributed to dwelling heating may be presented in comparison to one or more consumption benchmarks indicating low, average, and/or high dwelling heating consumptions of dwellings in a similar geographic region and/or having similar dwelling characteristics. Optionally, the comparison is presented to the user on a consumption efficiency spectrum as described above.

Figure 5:
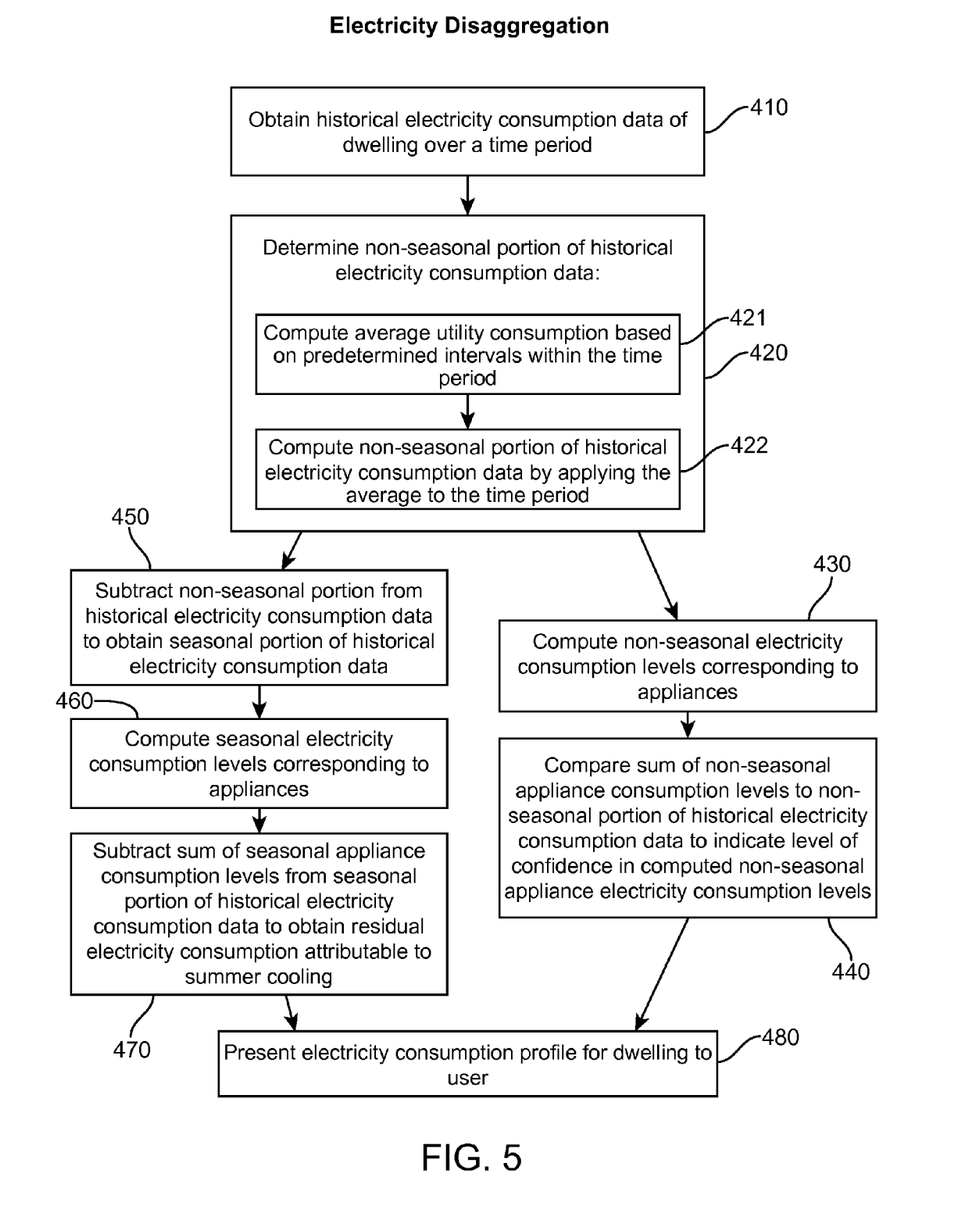
FIG. 5 is a flow diagram illustrating one embodiment of disaggregation of historical electricity consumption data.

FIG. 5 is a flow diagram illustrating an exemplary disaggregation of electricity consumption. At step 410, historical electricity consumption data over a time period may be obtained, for example from an electricity bill issued by the electricity provider for the dwelling. Alternatively, the historical electricity consumption data may be obtained by other means, for example by using smart energy meters such as The Energy Detective Meter (T.E.D.) manufactured by Energy Inc. located in Charleston, S.C.

At step 420, a non-seasonal electricity consumption portion is established by applying an average of predetermined intervals to the time period of the historical electricity utility data as described above. As seen in FIG. 5, step 420 is divided into sub-steps 421 and 422. At sub-step 421, the predetermined intervals are established based on intervals during which electricity consumption is substantially independent of environmental factors. For example, when the dwelling is located in a temperate and/or continental climate, the predetermined interval may be selected to occur within seasonal transition months such as May and November. In such intervals, electricity consumption may be substantially independent of consumption attributable to dwelling cooling.

The electricity consumption of the predetermined interval is then averaged and at sub-step 422, the average is applied to the entire period of the historical utility consumption as described above to establish the non-seasonal electricity consumption.

At step 430, consumptions of various non-seasonal electricity consumption sources are determined. Non-seasonal electricity consumption sources may be one or more dwelling features such as various appliances, other electricity consuming devices, and/or characteristics of the dwelling. Electricity consumption of the various sources may be determined based on the characteristics of the source and/or its usage characteristics. For example, the non-seasonal consumption source may be one or more lighting apparatus, and the characteristics of the lighting apparatus may include a type and/or a number of the lighting apparatus in the dwelling. It is contemplated that other non-seasonal consumption sources may include a refrigerator, washing machine, microwave, computer, television, etc., and the characteristics may be type of the source, age of the source, frequency of usage, etc.

At step 440, a sum of the consumptions of the various non-seasonal consumption sources may be calculated and the sum is subtracted from the total non-seasonal portion. The remaining non-seasonal portion may be further disaggregated by determining electricity consumed by "always-on" sources that generally constantly consume electricity. Exemplary always-on sources include, but not limited to cell-phone charger, laptop charger, DVD/VCR player, digital video recorders, stereo systems, air purifiers, etc. A sum of the utility consumed by the "always-on" sources may be calculated and the sum is subtracted from the remaining portion, which may produce a leftover portion.

The leftover portion may be attributed to electricity consumption that may be difficult to disaggregate and is therefore generally not attributed to specifically identified consumption sources. The leftover portion may indicate a level of confidence in the disaggregation of the electricity consumption, in that the size of the residual portion inversely indicates the percentage of consumption that has been attributed to particular sources. Thus, the leftover portion is preferably a small percentage of the total historical consumption data. When the leftover portion accounts for a significant portion of the total consumption, the consumption of the various identifiable sources as stated above may be adjusted to improve accuracy.

As described above, at step 450, the non-seasonal electricity consumption is subtracted from the total historical utility consumption of the dwelling and the remaining portion is attributed to seasonal electricity consumption. At step 460, the seasonal electricity consumption may be further disaggregated by determining the consumption of seasonal electricity consumption sources. Seasonal electricity consumption sources may be dwelling features such as various appliances and other electricity consuming devices, or characteristics of the dwelling where amount of electricity consumption substantially varies according to environmental factors. In one embodiment, the seasonal consumption source is a pool pump, wherein the electricity consumption of the pool pump generally increases during a season of elevated temperature, such as during the summer season.

A sum of electrical consumption of seasonal sources is then subtracted from the seasonal portion, and the remaining electrical consumption is attributed to dwelling cooling electricity consumption. Alternatively, instead of the disaggregation method described above, the dwelling cooling electricity consumption may be determined by end-use methods where consumption is determined using dwelling characteristics, dwelling occupant behavior, and/or geographical characteristics of the location of the dwelling. The end-use methods may comprise presenting a user-interface or conducting a phone interview to collect data indicating one or more parameters of the dwelling, including dwelling features such as number of appliances in the dwelling, their type, and behavioral dependent features such as appliance usage frequencies.

At step 470, in an embodiment where the seasonal electricity consumption is determined using two separate approaches, namely using historical utility consumption disaggregation as well as using end-use methods, as described above, a choice may be made as to which computation result is to be used for the utility consumption profile. In one embodiment, the two results are compared to determine a level of confidence in the accuracy of the determined seasonal cooling consumption. The level of confidence may be determined by the amount of deviation between the end-use consumption and the disaggregated consumption. In one embodiment, if the deviation is sufficiently high, then the end-use methods may be adjusted.

Additionally, the results of the end-use methods described above may be compared with the historical electricity consumption data such that when the results of the end-use methods account for more than 100% of the historical electricity consumption data, then the end-use methods may be adjusted to ensure that the disaggregation always results in being able to account for up to 100% of the utility bill but not over.

At step 480, the disaggregated electricity profile is presented to the user as described above. In one embodiment, the electricity consumption profile presented to the user comprises the dwelling cooling consumption, and the non-seasonal consumption attributable to daily electricity usage in kWh and/or monetary units such as dollars. In another embodiment, the electricity consumption profile presented to the user comprises consumption of various seasonal and/or non-seasonal sources. The dwelling electricity consumption profile may also be presented as a comparison against one or more electricity consumption benchmarks indicating low, average, and/or high electricity consumption, as described in detail above.

Figure 6:
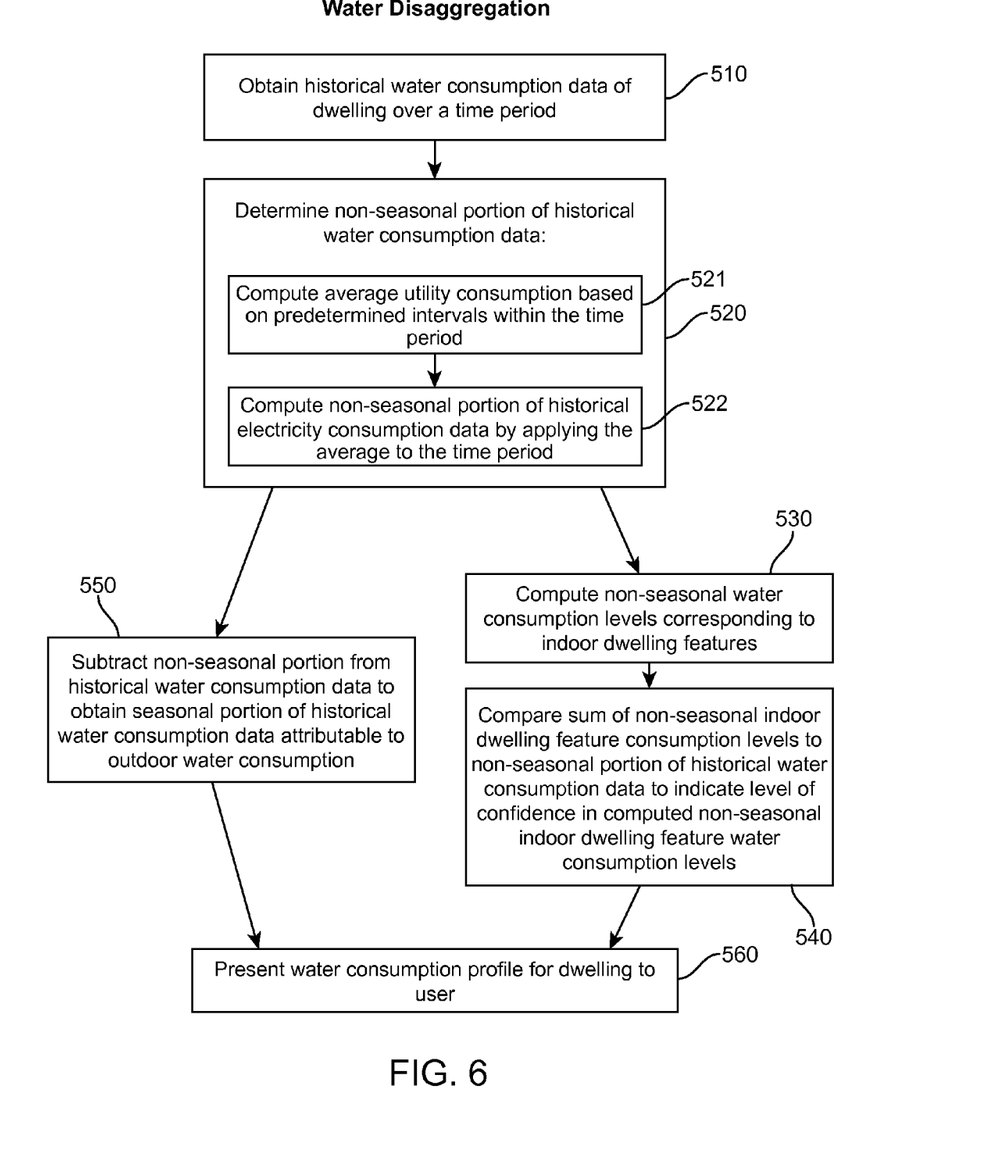
FIG. 6 is a flow diagram illustrating one embodiment of disaggregation of historical electricity consumption data.

FIG. 6 is a flow diagram illustrating an exemplary disaggregation of historical water consumption profile. At step 510, historical water consumption data over a time period may be obtained, for example from a water bill issued by a water utility provider for the dwelling. At step 520, a non-seasonal water consumption portion is determined by selecting intervals of low outdoor water consumption.

As seen in FIG. 6, step 520 is divided into sub-steps 521 and 522. At sub-step 521, the predetermined intervals are established based on intervals during which outdoor water consumption is generally minimal. In one embodiment, the intervals are within the winter season.

The water consumption of the predetermined interval is then averaged and at sub-step 522, the average is applied to the entire period of the historical utility consumption as described above to establish the non-seasonal water consumption attributed to indoor water consumption.

At step 530, consumptions of various indoor water consumption sources may be determined by end-use methods, which may comprise presenting a user-interface or conducting a phone interview to collect data indicating one or more parameters of the dwelling, including dwelling features such as number of appliances in the dwelling, their types, and behavioral-dependent features such as appliances usage frequencies. Indoor consumption sources may be one or more dwelling features such as various water-consuming appliances, devices, and/or characteristics of the dwelling that contribute to water consumption. Water consumption of the dwelling features may be determined based on the characteristics of the consumption source and/or its usage characteristics.

In one embodiment, the dwelling feature may be a toilet, and the water consumption of the toilet may be determined by the type of the toilet, age of the toilet, flushes per day, number of occupants in the dwelling, and/or volume of water used per flush. The dwelling feature may also be a bathtub, and the water consumption of the bathtub may be determined by a volume of the bathtub, number of occupants in the dwelling and/or frequency of usage. In another embodiment, the dwelling feature may be a shower, and the water consumption of the shower may be determined by the type of the showerhead, number of occupants in the dwelling, and/or frequency of usage. The dwelling feature may be a clothes washer, and the water consumption of the clothes washer may be determined by the type of the clothes washer, age of the clothes washer, number of occupants in the dwelling, number of loads washed per week, and/or volume of water consumed per load. The dwelling feature may also be a dishwasher, and the water consumption of the dishwasher may be determined by the type of the dishwasher, age of the dishwasher, number of occupants in the dwelling, number of dish loads washed per week, and/or volume of water consumed per load. Furthermore, the dwelling feature may be a faucet and the water consumption of the faucet may be determined by the age of the faucet, type of the faucet, number of occupants in the dwelling, and/or volume of water flow through the faucet per minute.

At step 540, water consumption of various indoor water consumption sources are summed to an end-use indoor water consumption portion. The end-use indoor water consumption portion is compared to the disaggregated indoor water consumption portion to determine a level of confidence in the accuracy of the determined indoor water consumption. Specifically, the level of confidence is determined by the amount of deviation between the sum of end-use consumption methods and the disaggregated indoor consumption portion. In one embodiment, when the deviation is sufficiently high, the end-use water consumption portion may be adjusted such that the deviation is within a predetermined range. In one embodiment, the predetermined range is 0% to 10%.

Additionally and optionally, when the end-use consumption is below the disaggregated consumption, the remaining residual portion may be attributed to outdoor water consumption.

Additionally, the results of the end-use methods described above may be compared with the historical water consumption data such that when the results of the end-use methods account for more than 100% of the historical water consumption data, then the end-use methods may be adjusted to ensure that the disaggregation always results in being able to explain up to 100% of the historical water consumption data but not over.

At step 550, the indoor water consumption is subtracted from the historical water consumption data to obtain a seasonal portion of historical water consumption data attributable to outdoor water consumption.

Alternatively, the historical water consumption data may be disaggregated by first determining the indoor water consumption portion corresponding to indoor dwelling features by the end-use methods as described in step 530 above. The end-use indoor water consumption portion is then subtracted from the total historical water consumption data to obtain a seasonal portion of historical water consumption data that is attributable to outdoor water consumption.

At step 560, the water consumption profile is generated and may be presented to the user as 100 cubic feet (CCF), liter, gallon, and/or monetary units such as dollars. In one embodiment, the profile presented to the user includes a winter water consumption, which is an average of water consumption per occupant per day during the winter season and summer water consumption, which is an average of water consumption per day during the summer season. Additionally, the profile may be presented to the user as indoor water consumption normalized by number of occupants in the dwelling, and the outdoor water consumption normalized by an outdoor area of a dwelling lot.

Additionally, as described above, water consumption profile is presented along a spectrum indicating one or more predetermined water consumption profiles indicating low, average, and/or high water consumption of similar dwellings in the region.

It is noted that the disclosed methods and systems as described above and illustrated in the corresponding flow diagrams can be implemented by computer program instructions. These program instructions may be provided to a processor to produce a machine, such that the instructions may create means for implementing the various steps specified above and in the flow diagrams.

The computer program instructions may be executed by a processor to cause a series of steps as described and illustrated to be performed by the processor to produce a computer implemented process such that the instructions, which execute on the processor to provide steps for implementing the steps as described. The computer programs instructions may also cause at least some of the steps to be performed in parallel. It is envisioned that some of the steps may also be performed across more than one processor, for example, in a multi-processor computer system. In addition, one or more steps or combination of steps may also be performed concurrently with other steps or combinations of steps, or even in a different sequence than illustrated.

It is further noted that the steps or combination thereof as described above and illustrated in the corresponding flow diagrams may be implemented by special purpose hardware-base systems configured to perform the specific steps of the disclosed methods, or various combinations of special purpose hardware and computer instructions.

While the above is a complete description of the preferred embodiments, various alternatives, modifications, and equivalents may be used. Therefore, the above description should not be taken as limiting the scope of the disclosure, which is defined by the appended claims.

What is claimed is:

1. A computer-implemented method for itemizing water consumption, comprising:
   obtaining data indicating historical water consumption of a dwelling over a time period;
   determining a non-seasonal portion of the historical water consumption data by (a) computing an average water consumption based on one or more predetermined intervals within the time period, and (b) computing the non-seasonal portion by applying the average to the time period;
   subtracting the non-seasonal portion from the historical water consumption data to obtain a seasonal portion of the historical water consumption data;
   generating a water consumption profile for the dwelling indicating non-seasonal consumption and seasonal consumption;
   indicating the non-seasonal portion as attributable to indoor water consumption in the water consumption profile;
   computing at least one water consumption level corresponding to at least one indoor dwelling feature;
   indicating a level of confidence in the computed indoor dwelling feature consumption level by comparing a sum of the computed consumption level to the non-seasonal portion attributed to indoor water consumption; and
   presenting, via a display, the indoor dwelling feature and the corresponding consumption level in the water consumption profile to a user.

2. The method of claim 1, further comprising comparing the water consumption profile for the dwelling with another water consumption benchmark.

3. The method of claim 1, further comprising computing an average of the historical water consumption data corresponding to a billing cycle used by a water provider serving the dwelling, and indicating a billing tier applicable to the computed average consumption.

4. The method of claim 1, wherein the one or more predetermined intervals are determined based on a geographical region of the dwelling.

5. The method of claim 1, further comprising normalizing the indoor water consumption based on the number of occupants in the dwelling, and presenting the normalized indoor water consumption to the user in the water consumption profile.

6. The method of claim 1, further comprising obtaining the historical water consumption data from a water bill.

7. A computer-implemented method for itemizing energy consumption, comprising:
- obtaining data indicating historical electricity consumption of a dwelling over a time period;
- determining a non-seasonal portion of the historical electricity consumption data by (a) computing an average electricity consumption based on one or more predetermined intervals within the time period, and (b) computing the non-seasonal portion by applying the average to the time period;
- subtracting the non-seasonal portion from the historical electricity consumption data to obtain a seasonal portion of the historical electricity consumption data;
- generating an electricity consumption profile for the dwelling indicating non-seasonal consumption and seasonal consumption;
- computing at least one non-seasonal electricity consumption level corresponding to at least one dwelling feature;
- computing at least one always-on electricity consumption level corresponding to the dwelling feature, wherein computing the always-on consumption level comprises obtaining at least one parameter of the dwelling feature and using the parameter to determine the non-seasonal electricity consumption level and wherein the always-on consumption level comprises electricity consumption of dwelling feature that substantially constantly consumes electricity; and
- presenting, via a display, the dwelling feature and the corresponding consumption level to a user.

8. The method of claim 7, further comprising subtracting a sum of the always-on electricity consumption levels from a residual portion of the historical electricity consumption data to obtain a portion indicating a level of confidence in the computation of the dwelling feature electricity consumption levels.

9. The method of claim 7, further comprising computing at least one seasonal electricity consumption level corresponding to at least one seasonally operated dwelling feature, and presenting the at least one dwelling feature and the corresponding seasonal electricity consumption level in the electricity consumption profile to the user.

10. The method of claim 7, further comprising obtaining the historical electricity consumption data from an electricity bill.

11. The method of claim 7, further comprising comparing the electricity consumption profile for the dwelling with another electricity consumption benchmark.

12. The method of claim 7, further comprising computing an average of the historical electricity consumption data corresponding to a billing cycle used by an electricity provider serving the dwelling, and indicating a billing tier applicable to the computed average consumption.

13. The method of claim 7, wherein the one or more predetermined intervals are determined based on a geographical region of the dwelling.

* * * * *